United States Patent
Chou et al.

(10) Patent No.: US 9,364,824 B2
(45) Date of Patent: Jun. 14, 2016

(54) ELECTROSPINNING SOLUTION, POLYVINYL ALCOHOL NANOFIBERS AND ION-EXCHANGE MEMBRANE

(71) Applicant: TAIWAN TEXTILE RESEARCH INSTITUTE, New Taipei (TW)

(72) Inventors: Hsin-Ying Chou, New Taipei (TW); Huan-Sheng Chien, New Taipei (TW); Haw-Jer Chang, New Taipei (TW); Ni Putu Dewi Nurmalasari, New Taipei (TW)

(73) Assignee: TAIWAN TEXTILE RESEARCH INSTITUTE, New Taipei (TW)

( * ) Notice: Subject to any disclaimer, the term of this patent is extended or adjusted under 35 U.S.C. 154(b) by 23 days.

(21) Appl. No.: 14/525,371

(22) Filed: Oct. 28, 2014

(65) Prior Publication Data
US 2015/0328631 A1 Nov. 19, 2015

(30) Foreign Application Priority Data

May 13, 2014 (TW) .............................. 103116859 A (51) Int. Cl.
| | | |
|---|---|---|
| *B01J 39/20* | (2006.01) |
| *C08F 116/06* | (2006.01) |
| *D01D 5/00* | (2006.01) |
| *B01D 71/38* | (2006.01) |
| *B01D 69/02* | (2006.01) |
| *B01D 71/82* | (2006.01) |
| *C08J 5/22* | (2006.01) |
| *D01F 1/10* | (2006.01) |
| *D01F 6/14* | (2006.01) |
| *B01D 67/00* | (2006.01) |
| *H01M 2/16* | (2006.01) |

(52) U.S. Cl.
CPC ............. *B01J 39/20* (2013.01); *B01D 67/0004* (2013.01); *B01D 69/02* (2013.01); *B01D 71/38* (2013.01); *B01D 71/82* (2013.01); *C08F 116/06* (2013.01); *C08J 5/22* (2013.01); *D01D 5/00* (2013.01); *D01D 5/003* (2013.01); *D01F 1/10* (2013.01); *D01F 6/14* (2013.01); *B01D 2323/39* (2013.01); *D10B 2321/06* (2013.01); *H01M 2/1653* (2013.01); *Y10T 428/298* (2015.01)

(58) Field of Classification Search
CPC .......... B01J 39/20; D01D 5/00; C08F 116/06; B01D 71/38; B01D 71/82; B01D 67/0004; B01D 69/02; D01F 1/10; D01F 6/14; C08J 5/22
USPC .......................................................... 521/26
See application file for complete search history.

(56) References Cited

PUBLICATIONS

Xie et al. "Ultra-high surface fibrous membranes from electrospinning of natural proteins: casein and lipase enzyme", Journal of Materials Science, 38 (2003), pp. 2125-2133.*
Stone et al. "In situ citric acid crosslinking of alginate/polyvinyl alcohol electrospun nanofibers", Materials Letters (2013), 112, 32-35.*
Islam et al. "Fabrication and characterization of poly(vinyl alcohol)/alginate blend nanofibers by electrospinning method", Colloids and Surfaces A: Physicochemical and Engineering Aspects, vol. 366, Issues 1-3, Aug. 2010, pp. 135-140.*

* cited by examiner

*Primary Examiner* — Michael M Bernshteyn
(74) *Attorney, Agent, or Firm* — McClure, Qualey & Rodack, LLP (57) ABSTRACT

An ion-exchange membrane is provided, and the fibers of the ion-exchange membrane are obtained by electrospinning. The electrospinning solution contains 100 parts by weight of polyvinyl alcohol (PVA), 10-100 parts by weight of a modifier, 10-100 parts by weight of an ion exchanger, and 100-2,500 parts by weight of water. The modifier has a reactive group that can react with the hydroxyl groups of the PVA. The ion exchanger has a polar functional group that can form hydrogen bonds with the hydroxyl groups of the PVA, and has an anion group that can provide ion-exchange ability.

15 Claims, 1 Drawing Sheet

ELECTROSPINNING SOLUTION, POLYVINYL ALCOHOL NANOFIBERS AND ION-EXCHANGE MEMBRANE

CROSS-REFERENCE TO RELATED APPLICATION

This application claims the priority benefit of Taiwanese application serial no. 103116859, filed May 13, 2014, the full disclosure of which is incorporated herein by reference.

BACKGROUND

1. Technical Field

The disclosure relates to a spinning solution, nanofibers, and an ion-exchange material. More particularly, this disclosure is related to an electrospinning solution, polyvinyl alcohol nanofibers, and an ion-exchange membrane thereof.

2. Description of Related Art

The precision requirement of semiconductor manufacturing processes has increased, and thus the focus of the pollution prevention has been transferred from particulates to gaseous molecular contaminants. Generally speaking, the pollution from polar gases or ionic gases, such as $NH_3$ and $NH_4^+$, is more serious for both semiconductor processes and display panel processes. Presently, besides active carbon and ion-exchange resin, a method that can effectively remove the pollution of polar gases or ionic gases has not been developed. Active carbon can filter out some gaseous contaminants, but the adsorption of polar gases, such as ammonia ($NH_3$), or other trace gases is very poor. Moreover, the adsorbed gases may be released by the active carbon again. Recently, the developed ion-exchange fibrous filter can solve the problems of the active carbon. However, the fiber fineness is not enough, which leads to the smaller contact surface between the fibrous filter and the gases and limited ion-exchange efficiency.

SUMMARY

In one aspect, the present invention is directed to an electrospinning solution for electrospinning. The composition of the electrospinning solution includes 100 parts by weight of polyvinyl alcohol (PVA), 10-100 parts by weight of a modifier, 10-100 parts by weight of an ion exchanger, and 100-2,500 parts by weight of water. The modifier has a reactive group that can react with the hydroxyl groups of the PVA at a temperature of 100-200° C. The ion exchanger has a polar functional group and an anion group, and the polar functional group can form hydrogen bonding with the hydroxyl groups of the PVA.

According to some embodiments, the weight average molecular weight of PVA is about 15,000 to about 120,000.

According some other embodiments, the reactive group of the modifier comprises an isocyanate (—NCO) group, a carboxylate group (—COO—), or a nitro group (—$NO_2^-$), such as and $R_1$ is According some other embodiments, the polar functional group of the ion exchanger is —OH, —$NH_2$, —COOH, —CHO, —F, or any combinations thereof.

According some other embodiments, the anion group of the ion exchanger is —$SO_3^-$, —$COO^-$, or —$NO_2^-$.

According to some other embodiments, the ion exchanger may be 5-sodium sulfoisophthalate (5-SSIPA), sodium dimethyl 5-sulphonatoisophthalate (SIPM), dimethyl 5-sulfoisophthalate sodium salt hydrate (SIPE), trisodium 2-hydroxypropane-1,2,3-tricarboxylate (i.e. sodium citrate), dipotassium ethylenediaminetetraacetate, sodium tartrate, sodium alginate, or sodium nitrite.

In another aspect, the present invention is directed to nanofibers of polyvinyl alcohol. The nanofibers of polyvinyl alcohol is electrospun by the electrospinning solution above, and the diameter of the nanofibers is about 50 nm to about 300 nm.

In yet another aspect, the present invention is directed to an ion-exchange membrane, which includes the nanofibers of polyvinyl alcohol above.

The foregoing presents a simplified summary of the disclosure in order to provide a basic understanding to the reader. This summary is not an extensive overview of the disclosure and it does not identify key or critical elements of the present invention or delineate the scope of the present invention. Its sole purpose is to present some concepts disclosed herein in a simplified form as a prelude to the more detailed description that is presented later. Many of the attendant features will be more readily appreciated as the same becomes better understood by reference to the following detailed description considered in connection with the accompanying drawings.

DETAILED DESCRIPTION

Accordingly, an ion-exchange membrane and a preparation method thereof are provided. The ion-exchange membrane can be used in air filtration, water filtration, and an isolation film of battery. The ion-exchange membrane is obtained by nanofibers of polyvinyl alcohol spun by electrospinning. Some hydroxyl groups of the polyvinyl alcohol are modified by a modifier to decrease the hydrolysis degree of polyvinyl alcohol. In addition, an ion exchanger is added to the electrospinning solution to let the fibrous membrane have ion-exchange ability.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Composition of Polyvinyl Alcohol Electrospinning Solution

The composition of polyvinyl alcohol (PVA) electrospinning solution includes 100 parts by weight of PVA, 10-100 parts by weight of a modifier, 10-100 parts by weight of an ion exchanger, and 100-2,500 parts by weight of water as a solvent.

The weight average molecular weight of the PVA above may be about 15,000 to about 120,000, such as 50,000-55,000, 75,000-80,000, 89,000-95,000, 107,000-112,000, and 112,000-120,000. The PVA is chosen to be the major material of the ion-exchange membrane since PVA has advantages of high drug resistance, good film formation, good light resistance, and non-toxicity.

The modifier above is used to react with some hydroxyl groups of the PVA to decrease the hydroxyl density, and the problem of the PVA decomposition caused by moisture absorption can thus be solved. Moreover, since the solvent used is water, the modifier has to be capable of being dissolved in water or being uniformly dispersed in the water.

Furthermore, the spinning temperature of the electrospinning process is better to be kept at a temperature of 50-60° C. to quickly dry the nanofibers of PVA (PVA nanofibers) for avoiding PVA nanofibers from adhering together when the PVA nanofibers are spun out by an electrospinning equipment. Therefore, the modifier is better not to react with PVA at the spinning temperature. Until the PVA nanofibers are dried at a drying temperature of 100-200° C., the modifier can react with the PVA. Hence, the inner pipelines of the electrospinning equipment are prevented from blocking by the solidified electrospinning solution.

The modifier has to have at least one reactive group, such as one, two, and three reactive groups, to react with the hydroxyl groups of the PVA. When the modifier has two or more reactive groups, the role of the modifier is similar to a crosslinking agent to crosslink the polyvinyl alcohol. The reactive group above may be an isocyanate (—NCO) group, a carboxylate group (—COO—), or a nitro group (—$NO_2^-$).

For example, the modifier may be and $R_1$ is

The ion exchanger above is a water-soluble, non-toxic organic anion. The ion exchanger has a polar group being capable of forming hydrogen bonds with the hydroxyl groups of the PVA. Common polar groups may be —OH, —$NH_2$, —COOH, —CHO, —F, or any combinations thereof. For examples, the ion exchanger may be 5-sodium sulfoisophthalate (5-SSIPA), sodium dimethyl 5-sulphonatoisophthalate (SIPM), dimethyl 5-sulfoisophthalate sodium salt hydrate (SIPE), trisodium 2-hydroxy-1,2,3-propanetricarboxylate (i.e. sodium citrate), dipotassium ethylenediamine tetraacetate, sodium tartrate, sodium alginate, or sodium nitrite.

Since the organic anion used as the ion exchanger has a polar group being capable of forming hydrogen bonds with the hydroxyl groups of the PVA, the organic anion can mix with the PVA by the hydrogen bonds to form a stable mixture. Moreover, since the organic anion used as the ion exchanger has an anionic group, the ion exchanger has cation-exchange ability. Furthermore, the charges of the ion exchanger can enhance the electric field effect of the electrospinning, and the yield of electrospinning is thus increased by 2-4 times.

Preparation of Ion-Exchange Membrane

The PVA electrospinning solution above is prepared first, and then the electrospinning step is performed to obtain nanofibers having a diameter of about 50 to about 300 nm. The temperature of the electrospinning step is kept at a temperature of 50-60° C. to more quickly dry the nanofibers spun out from the spinneret of the electrospinning equipment.

Therefore, the obtained nanofibers can avoid sticking together and cannot being separated to become microfibers.

After spinning out the nanofibers from the spinneret, the nanofibers may be collected by a collecting board to form a porous fibrous membrane. Next, the fibrous membrane is placed into an oven at a temperature of 100-200° C. to let the PVA react with the modifier in the nanofibers to increase the hydrolysis resistance of the fibrous membrane to obtain a hydrolysis-resistant ion-exchange membrane.

For more clearly explain the preparation method of the ion-exchange membrane and advantages of the ion-exchange membrane, examples and experimental results are illustrated below.

Embodiment 1

Preparation of PVA Ion-Exchange Membrane

In the examples below, the weight average molecular weights were 50,000-55,000 Da for sample PVA 1, 75,000-80,000 Da for sample PVA2, 89,000-95,000 Da for sample PVA3, 107,000-112,000 Da for sample PVA4, and 112,000-120,000 Da for PVA5, respectively. The used modifier included and $R_1$ is The used ion exchanger included 5-sodium sulfoisophthalate (5-SSIPA), sodium dimethyl 5-sulphonatoisophthalate (SIPM), dimethyl 5-sulfoisophthalate sodium salt hydrate (SIPE), trisodium 2-hydroxy-1,2,3-propanetricarboxylate (i.e. sodium citrate), dipotassium ethylenediamine tetraacetate, sodium tartrate, sodium alginate, or sodium nitrite.

The PVA, the modifiers, the ion exchangers, and water were mixed in various weight ratios to form various electrospinning solutions. Next, the various electrospinning solutions were used to perform electrospinning to form various fibrous membranes on a collecting board. The fibrous membranes were than dried at a temperature of 110-150° C. to obtain the final ion-exchange membranes. The electrospinning solutions and preparation steps of comparing examples are the same as those for the examples, but no ion exchangers were added. The various compositions of the electrospinning solutions for the comparing examples and the examples are listed in Tables 1-a to 1-g below.

TABLE 1-a

Composition of electrospinning solution for using PVA1

| Parts by weight | PVA1 | Modifier* | Ion Exchanger[#] | Water |
|---|---|---|---|---|
| Comparing Example A | 100 | 50 | 0 | 500-2500 |
| Example 1A | 100 | 50 | 50 | 500-2500 |
| Example 2A | 100 | 100 | 100 | 500-2500 |
| Example 3A | 100 | 16.7 | 16.7 | 167-833 |
| Example 4A | 100 | 33.3 | 33.3 | 167-833 |
| Example 5A | 100 | 10 | 10 | 100-500 |
| Example 6A | 100 | 20 | 20 | 100-500 |

*Modifier was OCN—⬡—CH₂—⬡—NCO.

[#]Ion exchanger was SIPE.

TABLE 1-b

Composition of electrospinning solution for using PVA2

| Parts by weight | PVA2 | Modifier* | Ion Exchanger[#] | Water |
|---|---|---|---|---|
| Comparing Example B | 100 | 50 | 0 | 500-2500 |
| Example 1B | 100 | 50 | 50 | 500-2500 |
| Example 2B | 100 | 100 | 100 | 500-2500 |
| Example 3B | 100 | 16.7 | 16.7 | 167-833 |
| Example 4B | 100 | 33.3 | 33.3 | 167-833 |
| Example 5B | 100 | 10 | 10 | 100-500 |
| Example 6B | 100 | 20 | 20 | 100-500 |

*Modifier was OCN—⬡—CH₂—⬡—NCO.

[#]Ion exchanger was SIPE.

TABLE 1-c

Composition of electrospinning solution for using PVA3

| Parts by weight | PVA3 | Modifier* | Ion Exchanger[#] | Water |
|---|---|---|---|---|
| Comparing Example C | 100 | 50 | 0 | 500-2500 |
| Example 1C | 100 | 50 | 50 | 500-2500 |
| Example 2C | 100 | 100 | 100 | 500-2500 |
| Example 3C | 100 | 16.7 | 16.7 | 167-833 |
| Example 4C | 100 | 33.3 | 33.3 | 167-833 |
| Example 5C | 100 | 10 | 10 | 100-500 |
| Example 6C | 100 | 20 | 20 | 100-500 |

*Modifier was OCN—⬡—CH₂—⬡—NCO.

[#]Ion exchanger was SIPE.

TABLE 1-d

Composition of electrospinning solution for using PVA4

| Parts by weight | PVA4 | Modifier* | Ion Exchanger# | Water |
|---|---|---|---|---|
| Comparing Example D | 100 | 50 | 0 | 500-2500 |
| Example 1D | 100 | 50 | 50 | 500-2500 |
| Example 2D | 100 | 100 | 100 | 500-2500 |
| Example 3D | 100 | 16.7 | 16.7 | 167-833 |
| Example 4D | 100 | 33.3 | 33.3 | 167-833 |
| Example 5D | 100 | 10 | 10 | 100-500 |
| Example 6D | 100 | 20 | 20 | 100-500 |

*Modifier was OCNNCO.

Ion exchanger was SIPE.

TABLE 1-e

Composition of electrospinning solution for using PVA5

| Parts by weight | PVA5 | Modifier* | Ion Exchanger# | Water |
|---|---|---|---|---|
| Comparing Example E | 100 | 50 | 0 | 500-2500 |
| Example 1E | 100 | 50 | 50 | 500-2500 |
| Example 2E | 100 | 100 | 100 | 500-2500 |
| Example 3E | 100 | 16.7 | 16.7 | 167-833 |
| Example 4E | 100 | 33.3 | 33.3 | 167-833 |
| Example 5E | 100 | 10 | 10 | 100-500 |
| Example 6E | 100 | 20 | 20 | 100-500 |

*Modifier was OCNNCO.

Ion exchanger was SIPE.

TABLE 1-f

Composition of electrospinning solution for using PVA5

| Parts by weight | PVA5 | Modifier* | Ion Exchanger# | Water |
|---|---|---|---|---|
| Comparing Example F | 100 | 0 | 0 | 100-500 |
| Example 7A | 100 | 10 | 10 | 100-500 |
| Example 7B | 100 | 20 | 20 | 100-500 |
| Example 8A | 100 | 10 | 10 | 100-500 |
| Example 8B | 100 | 20 | 20 | 100-500 |
| Example 9A | 100 | 10 | 10 | 100-500 |
| Example 9B | 100 | 20 | 20 | 100-500 |
| Example 10A | 100 | 10 | 10 | 100-500 |
| Example 10B | 100 | 20 | 20 | 100-500 |
| Example 11A | 100 | 10 | 10 | 100-500 |
| Example 11B | 100 | 20 | 20 | 100-500 |
| Example 12A | 100 | 10 | 10 | 100-500 |
| Example 12B | 100 | 20 | 20 | 100-500 |

*Modifiers were OCNNCO for

Examples 7A and 7B, $R_1$—NH—C(=O)—$CH_3$ ($R_1$ was ) for

Examples 8A and 8B, $R_1$—NH—C(=O)—$CH_3$ ($R_1$ was )

for Examples 9A and 9B, $R_1$—NH—C(=O)—$CH_3$ ($R_1$ was )

TABLE 1-f-continued

Composition of electrospinning solution for using PVA5 for Examples 10A and 10B, for Examples 11A and 11B, for Examples 12A and 12B, respectively.

Ion exchanger was SIPE.

TABLE 1-g

Composition of electrospinning solution for using different ion exchangers

| Parts by weight | PVA5 | Modifier* | Ion Exchanger# | Water |
|---|---|---|---|---|
| Comparing Example G | 100 | 0 | 0 | 100-500 |
| Example 13 | 100 | 20 | 1-50 | 100-500 |
| Example 14 | 100 | 20 | 1-50 | 100-500 |
| Example 15 | 100 | 20 | 1-50 | 100-500 |
| Example 16 | 100 | 20 | 1-50 | 100-500 |
| Example 17 | 100 | 20 | 1-50 | 100-500 |
| Example 18 | 100 | 20 | 1-50 | 100-500 |
| Example 19 | 100 | 20 | 1-50 | 100-500 |
| Example 20 | 100 | 20 | 1-50 | 100-500 |

*Modifier was OCN—⌬—$CH_2$—⌬—NCO.

Ion exchangers were 5-SSIPA for Example 13, SIPM for Example 14, SIPE for Example 15, trisodium 2-hydroxy-1,2,3-propanetricarboxylate for Example 16, dipotassium ethylenediamine tetraacetate for Example 17, sodium tartrate for Example 18, sodium alginate for Example 19, and sodium nitrite for Example 20.

Next, the various electrospinning solutions were used to perform electrospinning to obtain various nanofibers.

Embodiment 2

Properties of Nanofibers

The diameter of the obtained nanofibers were measured. The obtained data are listed in the Tables 2-a to 2-g below.

In the measurements of diameters, low-vacuum scanning electron microscope (LV-SEM) was used to record the images of the obtained fibrous membrane. Then, an image analysis software, Image-J, was used to analyze the diameters of the nanofibers in the SEM images to obtain the average diameter and diameter distribution results of the nanofibers.

TABLE 2-a

Properties of the nanofibers obtained from PVA1.

| | Diameters of PVA1 fibers | | |
|---|---|---|---|
| Sample | Distribution range (nm) | Average (nm) | Fineness Concentration Ratio (%) |
| Comparing Example A | 50-250 | 198 | 80 |

TABLE 2-a-continued

Properties of the nanofibers obtained from PVA1.

| | Diameters of PVA1 fibers | | |
|---|---|---|---|
| Sample | Distribution range (nm) | Average (nm) | Fineness Concentration Ratio (%) |
| Example 1A | 50-250 | 157 | 80 |
| Example 2A | 50-250 | 178 | 80 |
| Example 3A | 50-250 | 183 | 80 |
| Example 4A | 50-250 | 191 | 80 |
| Example 5A | 50-250 | 197 | 80 |
| Example 6A | 50-250 | 200 | 80 |

TABLE 2-b

Properties of the nanofibers obtained from PVA2.

| | Diameters of PVA2 fibers | | |
|---|---|---|---|
| Sample | Distribution range (nm) | Average (nm) | Fineness Concentration Ratio (%) |
| Comparing Example B | 50-250 | 220 | 80-90 |
| Example 1B | 50-250 | 166 | 80-90 |
| Example 2B | 50-250 | 188 | 80-90 |
| Example 3B | 50-250 | 192 | 80-90 |
| Example 4B | 50-250 | 198 | 80-90 |
| Example 5B | 50-250 | 200 | 80-90 |
| Example 6B | 50-250 | 204 | 80-90 |

TABLE 2-c

Properties of the nanofibers obtained from PVA3.

| | Diameters of PVA3 fibers | | |
|---|---|---|---|
| Sample | Distribution range (nm) | Average (nm) | Fineness Concentration Ratio (%) |
| Comparing Example C | 50-250 | 235 | 80-90 |
| Example 1C | 50-250 | 180 | 80-90 |
| Example 2C | 50-250 | 197 | 80-90 |
| Example 3C | 50-250 | 202 | 80-90 |
| Example 4C | 50-250 | 210 | 80-90 |
| Example 5C | 50-250 | 215 | 80-90 |
| Example 6C | 50-250 | 223 | 80-90 |

TABLE 2-d

Properties of the nanofibers obtained from PVA4.

| | Diameters of PVA4 fibers | | |
|---|---|---|---|
| Sample | Distribution range (nm) | Average (nm) | Fineness Concentration Ratio (%) |
| Comparing Example D | 50-250 | 270 | 80-90 |
| Example 1D | 50-250 | 201 | 80-90 |
| Example 2D | 50-250 | 232 | 80-90 |
| Example 3D | 50-250 | 243 | 80-90 |
| Example 4D | 50-250 | 248 | 80-90 |
| Example 5D | 50-250 | 250 | 80-90 |
| Example 6D | 50-250 | 256 | 80-90 |

TABLE 2-e

Properties of the nanofibers obtained from PVA5.

| | Diameters of PVA5 fibers | | |
|---|---|---|---|
| Sample | Distribution range (nm) | Average (nm) | Fineness Concentration Ratio (%) |
| Comparing Example E | 50-250 | 331 | 80-90 |
| Example 1E | 50-250 | 246 | 80-90 |
| Example 2E | 50-250 | 282 | 80-90 |
| Example 3E | 50-250 | 295 | 80-90 |
| Example 4E | 50-250 | 298 | 80-90 |
| Example 5E | 50-250 | 300 | 80-90 |
| Example 6E | 50-250 | 307 | 80-90 |

TABLE 2-f

Properties of the nanofibers obtained from PVA5.

| | Diameters of PVA5 fibers | | |
|---|---|---|---|
| Sample | Distribution range (nm) | Average (nm) | Fineness Concentration Ratio (%) |
| Comparing Example F | 50-250 | 220 | 80-90 |
| Example 7A | 50-250 | 166 | 80-90 |
| Example 7B | 50-250 | 172 | 80-90 |
| Example 8A | 50-250 | 178 | 80-90 |
| Example 8B | 50-250 | 188 | 80-90 |
| Example 9A | 50-250 | 179 | 80-90 |
| Example 9B | 50-250 | 188 | 80-90 |
| Example 10A | 50-250 | 184 | 80-90 |
| Example 10B | 50-250 | 191 | 80-90 |
| Example 11A | 50-250 | 192 | 80-90 |
| Example 11B | 50-250 | 181 | 80-90 |
| Example 12A | 50-250 | 185 | 80-90 |
| Example 12B | 50-250 | 195 | 80-90 |

TABLE 2-g

Properties of the nanofibers obtained from PVA5.

| | Diameters of PVA5 fibers | | |
|---|---|---|---|
| Sample | Distribution range (nm) | Average (nm) | Fineness Concentration Ratio (%) |
| Comparing Example G | 50-250 | 220 | 80-90 |
| Example 13 | 50-250 | 182 | 80-90 |
| Example 14 | 50-250 | 198 | 80-90 |
| Example 15 | 50-250 | 169 | 80-90 |
| Example 16 | 50-250 | 182 | 80-90 |

TABLE 2-g-continued

Properties of the nanofibers obtained from PVA5.

| | Diameters of PVA5 fibers | | |
|---|---|---|---|
| Sample | Distribution range (nm) | Average (nm) | Fineness Concentration Ratio (%) |
| Example 17 | 50-250 | 173 | 80-90 |
| Example 18 | 50-250 | 186 | 80-90 |
| Example 19 | 50-250 | 176 | 80-90 |
| Example 20 | 50-250 | 193 | 80-90 |

From the data of Tables 2-a to 2-e, it can be known that the average diameter of the PVA nanofibers was increased as the addition amount of PVA or modifier was increased. Respectively comparing the Comparing Examples A to E and the Examples 1A to 1E, the addition of ion exchanger decreased the average diameters of the PVA nanofibers. From Table 2-f, it can be known that various modifiers had little effect on the properties of PVA nanofibers since the addition amount of the modifiers was quite little. From Table 2-g, it can be known that various ion exchangers had little effect on the properties of PVA nanofibers since the addition amount of the ion exchangers was quite little. According to Tables 2-a to 2-g, the fineness concentration ratios were quite consistent. This result shows that fairly uniform thickness PVA nanofibers can be obtained by electrospinning.

Embodiment 3

Properties of PVA Nano-Fibrous Membranes

The different PVA nanofibers obtained from Embodiment 2 were formed into PVA nano-fibrous membranes on a collecting board.

In the properties of PVA nano-fibrous membranes, some basic properties, such as thickness, basic weight, and tensile strength, as well as some other properties, such as porosity, air permeability, ion-exchange capacity, ammonia removal rate, and hydrolysis resistance, were measured or tested. The obtained data are listed in Tables 3-a to 3-g and Tables 4-a and 4-g below.

Basic properties of PVA nano-fibrous membranes were measured first. The thicknesses of the nano-fibrous membranes were measured by a thickness gauge. Four corners, four middles of the four sides, and the central point of a PVA nano-fibrous membrane were sampling to measure the thickness, and an average number thereof was taken as the thickness of the PVA nano-fibrous membrane.

The method of measuring the basic weight of PVA nano-fibrous membranes is described below. A first sample of 30 cm×40 cm was cut from a PVA nano-fibrous membrane. Next, four second samples of 10 cm×10 cm was cut from four sides of the first sample, and two third samples of 10 cm×10 cm was cut from the central area. The four second samples and the two third samples were then weighted and an average number thereof was taken as the basic weight of the PVA nano-fibrous membranes.

In the measurement of tensile strength, a tensile test analyzer was used. Before testing, a sample of 16 cm×10 cm was cut from a PVA nano-fibrous membrane. The sample was then put in the fixture of the tensile test analyzer to perform tensile test. When the sample was broken, the applied force of the analyzer was recorded and then calculated to obtain tensile strength of the PVA nano-fibrous membrane.

TABLE 3-a

Basic properties of fibrous membranes obtained from PVA1

| Sample | Thickness (μm) | Basic weight (g/m$^2$) | Tensile Strength (kg/m) |
|---|---|---|---|
| Comparing Example A | 245 | 2.29 | 2.438 |
| Example 1A | 249 | 2.41 | 6.703 |
| Example 2A | 250 | 2.36 | 6.012 |
| Example 3A | 253 | 2.47 | 4.798 |
| Example 4A | 246 | 2.34 | 5.084 |
| Example 5A | 241 | 2.46 | 3.065 |
| Example 6A | 250 | 2.52 | 3.326 |

TABLE 3-b

Basic properties of fibrous membranes obtained from PVA2

| Sample | Thickness (μm) | Basic weight (g/m$^2$) | Tensile Strength (kg/m) |
|---|---|---|---|
| Comparing Example B | 248 | 2.33 | 2.457 |
| Example 1B | 253 | 2.43 | 6.749 |
| Example 2B | 251 | 2.38 | 6.021 |
| Example 3B | 252 | 2.47 | 4.978 |
| Example 4B | 247 | 2.34 | 5.084 |
| Example 5B | 245 | 2.43 | 3.075 |
| Example 6B | 249 | 2.48 | 3.256 |

TABLE 3-c

Basic properties of fibrous membranes obtained from PVA3

| Sample | Thickness (μm) | Basic weight (g/m$^2$) | Tensile Strength (kg/m) |
|---|---|---|---|
| Comparing Example C | 251 | 2.43 | 2.459 |
| Example 1C | 255 | 2.45 | 6.851 |
| Example 2C | 253 | 2.39 | 6.032 |
| Example 3C | 257 | 2.49 | 4.784 |
| Example 4C | 252 | 2.53 | 4.095 |
| Example 5C | 249 | 2.47 | 3.682 |
| Example 6C | 252 | 2.50 | 3.151 |

TABLE 3-d

Basic properties of fibrous membranes obtained from PVA4

| Sample | Thickness (μm) | Basic weight (g/m$^2$) | Tensile Strength (kg/m) |
|---|---|---|---|
| Comparing Example D | 249 | 2.33 | 2.357 |
| Example 1D | 256 | 2.37 | 6.529 |
| Example 2D | 251 | 2.35 | 6.012 |
| Example 3D | 247 | 2.42 | 4.964 |
| Example 4D | 251 | 2.31 | 5.012 |
| Example 5D | 249 | 2.41 | 3.231 |
| Example 6D | 243 | 2.43 | 3.056 |

TABLE 3-e

Basic properties of fibrous membranes obtained from PVA5

| Sample | Thickness (μm) | Basic weight (g/m$^2$) | Tensile Strength (kg/m) |
|---|---|---|---|
| Comparing Example E | 222 | 2.13 | 2.387 |

TABLE 3-e-continued

Basic properties of fibrous membranes obtained from PVA5

| Sample | Thickness (μm) | Basic weight (g/m²) | Tensile Strength (kg/m) |
|---|---|---|---|
| Example 1E | 236 | 2.23 | 5.949 |
| Example 2E | 241 | 2.26 | 5.027 |
| Example 3E | 248 | 2.34 | 4.278 |
| Example 4E | 236 | 2.28 | 3.884 |
| Example 5E | 231 | 2.23 | 2.995 |
| Example 6E | 229 | 2.18 | 3.050 |

TABLE 3-f

Basic properties of fibrous membranes obtained from PVA5

| Sample | Thickness (μm) | Basic weight (g/m²) | Tensile Strength (kg/m) |
|---|---|---|---|
| Comparing Example F | 248 | 2.33 | 2.457 |
| Example 7A | 251 | 2.43 | 6.749 |
| Example 7B | 249 | 2.41 | 6.654 |
| Example 8A | 248 | 2.43 | 6.743 |
| Example 8B | 246 | 2.40 | 6.582 |
| Example 9A | 252 | 2.43 | 6.745 |
| Example 9B | 250 | 2.42 | 6.742 |
| Example 10A | 252 | 2.41 | 6.745 |
| Example 10B | 250 | 2.40 | 6.742 |
| Example 11A | 253 | 2.44 | 6.732 |
| Example 11B | 249 | 2.42 | 6.728 |
| Example 12A | 246 | 2.41 | 6.733 |
| Example 12B | 242 | 2.39 | 6.731 |

TABLE 3-g

Basic properties of fibrous membranes obtained from PVA5

| Sample | Thickness (μm) | Basic weight (g/m²) | Tensile Strength (kg/m) |
|---|---|---|---|
| Comparing Example G | 248 | 2.33 | 2.457 |
| Example 13 | 250 | 2.45 | 6.733 |
| Example 14 | 240 | 2.38 | 6.453 |
| Example 15 | 247 | 2.41 | 6.352 |
| Example 16 | 238 | 2.38 | 6.312 |
| Example 17 | 232 | 2.34 | 6.320 |
| Example 18 | 246 | 2.45 | 6.513 |
| Example 19 | 233 | 2.30 | 6.332 |
| Example 20 | 239 | 2.41 | 6.356 |

From the data of Table 3-a to 3-e above, the thicknesses of the PVA nano-fibrous membranes distributed in a range of 257-249 nm, and the basic weight of the PVA nano-fibrous membranes distributed in a range of 2.13-2.53 g/m². These results show that the specification of the PVA nano-fibrous membranes was quite uniform. From Table 3-f, it can be known that the various modifiers had a little effect on the thicknesses of the fibrous membranes since the addition amount of the modifiers was quite little. From Table 3-g, it can be known that various ion exchangers had little effect on the properties of the fibrous membranes since the addition amount of the ion exchangers was quite little. Comparing the tensile strength of the Examples 1A-6A, 1B-6B, 1C-6C, 1D-6D, and 1E-6E, it can be known that when the weight ratio of the modifier over PVA was higher, the tensile strength of the PVA nano-fibrous was stronger. Respectively comparing the Comparing Examples A to E and the Examples 1A to 1E, it can be known that the tensile strength of PVA nano-fibrous membranes can be greatly increased by adding ion exchangers.

Next, some other properties of the PVA nano-fibrous membranes were measured. The method of measuring porosity and pore diameter concentration ratio was first trimming a PVA nano-fibrous membrane to a sample having suitable size and then fixing the sample in a fixture of a porosimetric analyzer (from PMI) to perform measurement. Then, the obtained data was analyzed by software to obtain data of porosity and pore diameter concentration ratio.

The air permeability was measured by an air permeability testing instrument. A sample of 10 cm×10 cm was cut from a PVA nano-fibrous membrane, and then fixed in a fixture of the air permeability testing instrument to perform measurement.

The content of sulfonate on the PVA nano-fibrous membrane was determined by Toluidine Blue O (TBO; the structure of TBO was shown below). Since TBO is positively charged when dissolved in NaOH aqueous solution, TBO can be adsorbed on the PVA nano-fibrous membrane by electrostatic attraction interaction between the positive charge of TBO and the negative charge of sulfonate of the PVA nano-fibrous membrane. Then, an aqueous solution of acetic acid was used to desorb the adsorbed TBO, and absorbance at 633 nm was measured. Comparing with the TBO concentration standard curve, the TBO desorption amount can be determined and then converted to the sulfonate content of the PVA nano-fibrous membrane.

TBO

TABLE 4-a

Other properties of fibrous membranes obtained from PVA1

| Sample | Porosity (%) | Pore diameter concentration ratio (%) | Air permeability (cc/cm²·s) | Ion-exchange capacity (μeq/g) |
|---|---|---|---|---|
| Comparing Example A | 80 | 89 | 3.51 | 0 |
| Example 1A | 81 | 90 | 1.23 | 2,248 |
| Example 2A | 83 | 91 | 1.21 | 1,367 |
| Example 3A | 82 | 92 | 1.22 | 836 |
| Example 4A | 84 | 91 | 1.26 | 922 |
| Example 5A | 85 | 90 | 1.23 | 723 |
| Example 6A | 82 | 89 | 1.24 | 731 |

TABLE 4-b

Other properties of fibrous membranes obtained from PVA2

| Sample | Porosity (%) | Pore diameter concentration ratio (%) | Air permeability (cc/cm²·s) | Ion-exchange capacity (μeq/g) |
|---|---|---|---|---|
| Comparing Example B | 81 | 90 | 3.47 | 0 |
| Example 1B | 80 | 91 | 1.05 | 2,213 |
| Example 2B | 83 | 92 | 1.03 | 1,372 |
| Example 3B | 82 | 92 | 1.07 | 825 |
| Example 4B | 83 | 93 | 1.01 | 907 |
| Example 5B | 81 | 91 | 1.02 | 694 |
| Example 6B | 84 | 92 | 1.01 | 708 |

TABLE 4-c

Other properties of fibrous membranes obtained from PVA3

| Sample | Porosity (%) | Pore diameter concentration ratio (%) | Air permeability (cc/cm$^2$·s) | Ion-exchange capacity (μeq/g) |
|---|---|---|---|---|
| Comparing Example C | 81 | 89 | 3.52 | 0 |
| Example 1C | 82 | 91 | 1.12 | 2,351 |
| Example 2C | 83 | 92 | 1.09 | 1,442 |
| Example 3C | 81 | 90 | 1.05 | 845 |
| Example 4C | 80 | 93 | 1.03 | 947 |
| Example 5C | 83 | 91 | 1.07 | 712 |
| Example 6C | 80 | 90 | 1.06 | 732 |

TABLE 4-d

Other properties of fibrous membranes obtained from PVA4

| Sample | Porosity (%) | Pore diameter concentration ratio (%) | Air permeability (cc/cm$^2$·s) | Ion-exchange capacity (μeq/g) |
|---|---|---|---|---|
| Comparing Example D | 82 | 90 | 3.31 | 0 |
| Example 1D | 81 | 92 | 1.18 | 2,202 |
| Example 2D | 80 | 93 | 1.16 | 1,265 |
| Example 3D | 83 | 91 | 1.11 | 817 |
| Example 4D | 87 | 90 | 1.18 | 897 |
| Example 5D | 83 | 95 | 1.16 | 701 |
| Example 6D | 82 | 90 | 1.12 | 742 |

TABLE 4-e

Other properties of fibrous membranes obtained from PVA5

| Sample | Porosity (%) | Pore diameter concentration ratio (%) | Air permeability (cc/cm$^2$·s) | Ion-exchange capacity (μeq/g) |
|---|---|---|---|---|
| Comparing Example E | 81 | 90 | 3.29 | 0 |
| Example 1E | 83 | 93 | 1.09 | 2,151 |
| Example 2E | 80 | 92 | 1.07 | 1,165 |
| Example 3E | 83 | 91 | 1.03 | 809 |
| Example 4E | 84 | 90 | 1.01 | 885 |
| Example 5E | 82 | 90 | 1.05 | 689 |
| Example 6E | 80 | 90 | 1.01 | 706 |

TABLE 4-f

Other properties of fibrous membranes obtained from PVA5

| Sample | Porosity (%) | Pore diameter concentration ratio (%) | Air permeability (cc/cm$^2$·s) | Ion-exchange capacity (μeq/g) |
|---|---|---|---|---|
| Comparing Example F | 81 | 90 | 3.47 | 0 |
| Example 7A | 83 | 92 | 1.03 | 2.213 |
| Example 7B | 83 | 91 | 1.02 | 2.208 |
| Example 8A | 82 | 90 | 1.02 | 2.143 |
| Example 8B | 83 | 90 | 1.03 | 2.032 |
| Example 9A | 81 | 92 | 1.07 | 2.082 |
| Example 9B | 82 | 91 | 1.12 | 2.143 |
| Example 10A | 81 | 92 | 1.03 | 2.060 |
| Example 10B | 83 | 92 | 1.05 | 2.091 |
| Example 11A | 80 | 92 | 1.06 | 2.056 |
| Example 11B | 82 | 93 | 1.15 | 2.007 |
| Example 12A | 83 | 90 | 1.17 | 2.102 |
| Example 12B | 82 | 92 | 1.09 | 1.989 |

TABLE 4-g

Other properties of fibrous membranes obtained from PVA5

| Sample | Porosity (%) | Pore diameter concentration ratio (%) | Air permeability (cc/cm$^2$·s) | Ion-exchange capacity (μeq/g) |
|---|---|---|---|---|
| Comparing Example G | 81 | 90 | 3.47 | 0 |
| Example 13 | 84 | 91 | 1.10 | 2,423 |
| Example 14 | 82 | 91 | 1.05 | 2,832 |
| Example 15 | 83 | 92 | 1.13 | 2,213 |
| Example 16 | 81 | 92 | 1.17 | 2,154 |
| Example 17 | 83 | 91 | 1.01 | 2,651 |
| Example 18 | 82 | 91 | 1.21 | 1,956 |
| Example 19 | 82 | 89 | 1.08 | 2,145 |
| Example 20 | 80 | 88 | 1.19 | 1,798 |

In Tables 4-a to 4-e, the porosity and pore diameter concentration ratio of each sample were quite the same. The porosity was 80-87%, and the pore diameter concentration ratio was 90-95%. These results show that the quality of the PVA nano-fibrous membranes were quite stable. In Table 4-f, since the addition amounts of the various modifiers were quite small, the modifiers had little effect on the properties of the PVA nano-fibrous membranes. In Table 4-g, since the addition amounts of the various ion exchangers were quite small, the ion exchangers had little effect on the properties of the PVA nano-fibrous membranes. Comparing the data of air permeability, it can be found that the samples without adding the ion exchanger had higher air permeability, and the samples with adding ion exchanger had lower air permeability. Comparing the ion-exchange capacity, it can be found that the ion-exchange capacity was higher when the weight ratio of the ion exchanger over the PVA was higher. In Examples 1A-1E and 2A-2E, the ion-exchange capacity was decreased as the addition amount of the ion exchanger was increased. However, in Examples 3A-3E, 4A-4E, 5A-5E, and 6A-6E, the ion-exchange capacity was slightly increased as the addition amount of the ion exchanger was increased. In Table 4-g, adding different ion exchangers had some effects on the ion-exchange capacity, but the overall ion-exchange capacities were above 1,500 (μeq/g).

Next, the ammonia removal rates of the Examples 1B and the Comparing Examples B were measured by an ammonia monitor analyzer. The measurement was performed at a temperature of 20-25° C., a relative humidity of 60-65%, an ammonia concentration of 10 ppm, and an ammonia flow rate of 1000 mL/min. It was found that the ammonia removal rate was kept at 100% in 4.5 hours after the ammonia passed through the PVA nano-fibrous membrane of Example 1B. However, the ammonia removal rate of the PVA nano-fibrous membrane of Comparing Example B was always at 0% during the measuring period. These results show that the sample of the Examples 1B had excellent ammonia removal ability.

Furthermore, the pressure loss of the obtained PVA nano-fibrous membrane was very small after gas passed, only about 8 mmH$_2$O. However, the pressure loss of HEPA (high-efficiency particulate air) filters or glass fiber filters are at least 15-30 mmH$_2$O. This result shows that the PVA nano-fibrous membranes above had excellent filter efficiency and can reach the HEPA level.

Embodiment 4

Hydrolysis Resistant Test of Ion-Exchange Membranes

The PVA nano-fibrous membrane obtained from Embodiment 3 were placed into an oven at a temperature of 100-200°

C. to let the PVA react with the modifier in the nanofibers to increase the hydrolysis resistance of the fibrous membrane to obtain a hydrolysis-resistant ion-exchange membrane.

Figure 1:
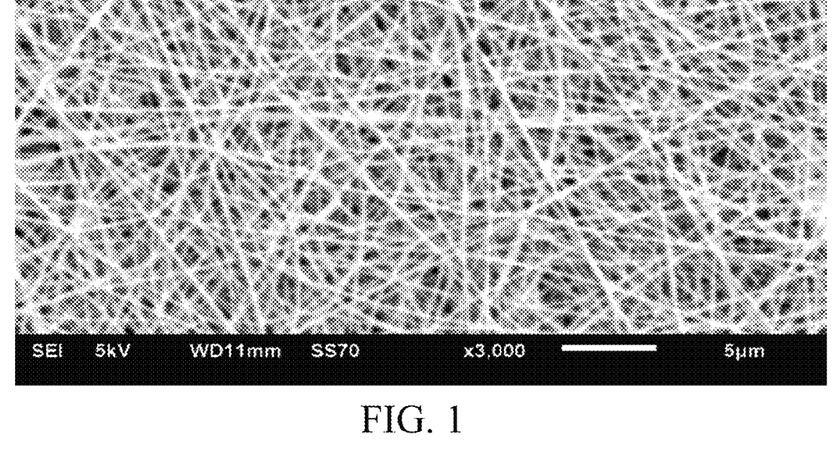
FIG. 1 is an image of scanning electron microscope (SEM) of example 3B before hydrolysis.
Figure 2:
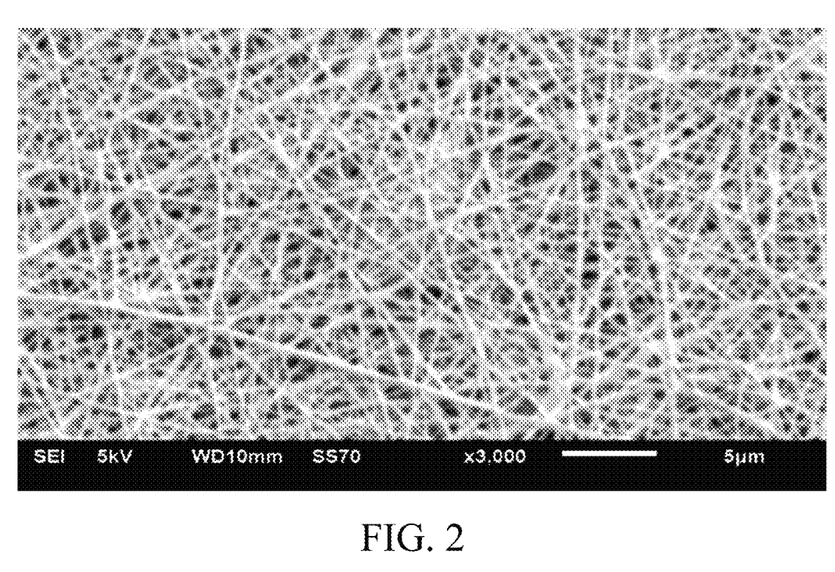
FIG. 2 is an image of scanning electron microscope (SEM) of example 3B after hydrolysis.

Hydrolysis resistance was also performed. The ion-exchange membranes obtained from the electrospinning solutions of Examples 1B-6B were respectively immersed in water for 2 months, and then taken out and dried. Scanning electron microscope (SEM) was used to observe the morphology of the fibers of the ion-exchange membranes. FIG. 1 is a SEM image of the ion-exchange membrane of Example 3B before hydrolysis, and FIG. 2 is a SEM image of the ion-exchange membrane of Example 3B after hydrolysis. Comparing FIGS. 1 and 2, it can be observed that the morphology of the fibers almost did not change after the hydrolysis test for 2 month. Moreover, all tests and measurements of Embodiments 2 and 3 were repeated again after hydrolyzing the sample of the Example 3B, and the data for the samples after hydrolysis were all the same as the data before hydrolysis. Therefore, it can be known that the modifier can let the PVA nanofibers have good hydrolysis resistance.

Accordingly, after adding a modifier and an ion exchanger into the electrospinning solution of PVA, the hydrolysis resistance of the PVA nanofibers can be improved, as well as the ion-exchange membrane has excellent cation-exchange ability to quickly adsorb cationic contaminants, so no cationic contaminants are released. Moreover, since the excellent cation-exchange ability of the ion-exchange membrane, the ion-exchange membrane can treat polar gas, such as ammonia, of low concentration. Therefore, the ion-exchange membrane can be applied to various uses, such as air filtration, water filtration, and isolation film of battery.

All the features disclosed in this specification (including any accompanying claims, abstract, and drawings) may be replaced by alternative features serving the same, equivalent or similar purpose, unless expressly stated otherwise. Thus, each feature disclosed is one example only of a generic series of equivalent or similar features.

What is claimed is:

1. An electrospinning solution, a composition of the electrospinning solution comprising:
   100 parts by weight of polyvinyl alcohol (PVA);
   10-100 parts by weight of a modifier having a reactive group that can react with hydroxyl groups of the PVA at a temperature of 100-200° C.;
   10-100 parts by weight of an ion exchanger having a polar functional group and an anion group, wherein the polar functional group is —OH, —NH$_2$, —COOH, —CHO, —F or any combinations thereof; and
   100-2,500 parts by weight of water.

2. The electrospinning solution of claim 1, wherein a weight average molecular weight of PVA is from about 15,000 to about 120,000.

3. The electrospinning solution of claim 1, wherein the reactive group of the modifier comprises an isocyanate (—NCO) group, a carboxylate group (—COO$^-$), or a nitro group (—NO$_2^-$).

4. The electrospinning solution of claim 1, wherein the modifier is

5. The electrospinning solution of claim 1, wherein the anion group of the ion exchanger is —SO$_3$, —COO$^-$, or —NO$_2^-$.

6. The electrospinning solution of claim 1, wherein the ion exchanger is 5-sodium sulfoisophthalate (5-SSIPA), sodium dimethyl 5-sulphonatoisophthalate (SIPM), dimethyl 5-sulfoisophthalate sodium salt hydrate (SIPE), trisodium 2-hydroxy-1,2,3-propanetricarboxylate (i.e. sodium citrate), dipotassium ethylenediamine tetraacetate, sodium tartrate, sodium alginate, or sodium nitrite.

7. Nanofibers of polyvinyl alcohol electrospun by an electrospinning solution, a composition of the electrospinning solution comprising:
   100 parts by weight of polyvinyl alcohol (PVA);
   10-100 parts by weight of a modifier having a reactive group that can react with hydroxyl groups of the PVA at a temperature of 100-200° C.;
   10-100 parts by weight of an ion exchanger having a polar functional group and an anion group, wherein the polar functional group is —OH, —NH$_2$, —COOH, —CHO, —F or any combinations thereof; and
   100-2,500 parts by weight of water.

8. The nanofibers of claim 7, wherein a weight average molecular weight of the PVA is from about 15,000 to about 120,000.

9. The nanofibers of claim 7, wherein the reactive group of the modifier comprises an isocyanate (—NCO) group, a carboxylate group (—COO$^-$), or a nitro group (—NO$_2^-$).

10. The nanofibers of claim 7, wherein the anion group of the ion exchanger is —SO$_3$, —COO$^-$, or —NO$_2^-$.

11. The nanofibers of claim 7, wherein a diameter of the nanofibers is from about 50 nm to about 300 nm.

12. An ion-exchange membrane comprising nanofibers of polyvinyl alcohol, wherein the nanofibers of polyvinyl alcohol are electrospun by an electrospinning solution, and a composition of the electrospinning solution comprising:
100 parts by weight of polyvinyl alcohol (PVA);
10-100 parts by weight of a modifier having a reactive group that can react with hydroxyl groups of the PVA at a temperature of 100-200° C.;
10-100 parts by weight of an ion exchanger having a polar functional group and an anion group, wherein the polar functional group is —OH, —$NH_2$, —COOH, —CHO, —F or any combinations thereof; and
100-2,500 parts by weight of water.

13. The ion-exchange membrane of claim 12, wherein a weight average molecular weight of the PVA is from about 15,000 to about 120,000.

14. The ion-exchange membrane of claim 12, wherein the reactive group of the modifier comprises an isocyanate (—NCO) group, a carboxylate group (—$COO^-$), or a nitro group (—$NO_2^-$).

15. The ion-exchange membrane of claim 12, wherein the anion group of the ion exchanger is —$SO_3^-$, —$COO^-$, or —$NO_2^-$.

* * * * *